Patented Feb. 27, 1951

2,543,237

UNITED STATES PATENT OFFICE 2,543,237

PRODUCTION OF NEW RESINOUS COMPOSITIONS FROM SULFONES AND FORMALDEHYDE

Edward Michael Evans, Tonbridge, and Harry Thurston Hookway, Croydon, England, assignors to British Resin Products Limited, London, England, a British company No Drawing. Application May 6, 1947, Serial No. 746,316. In Great Britain May 14, 1946

6 Claims. (Cl. 260—67)

This invention relates to new resinous compositions of matter having good resistance to acids and alkalies and good toughness and flexibility.

An object of the invention is the provision of the new resinous compositions themselves and a process for their production.

According to the present invention, there is provided a process for the production of new resinous compositions of matter which comprises reacting formaldehyde with a compound containing the following grouping CH—SO$_2$—CH, and heating the resulting product.

Polymers of formaldehyde may be used in addition to or in place of the monomeric formaldehyde which may be used in the form of its aqueous solution.

Suitable classes of compound containing one or more of the above groupings include the following, in which R, R', R'', R''', may be hydrogen, alkyl, aryl or substituted alkyl or aryl radicals:

I         RR'—CH—SO$_2$—CHR''R'''

II      RR'—CHSO$_2$—CH$_2$—SO$_2$—CH R''R'''

III 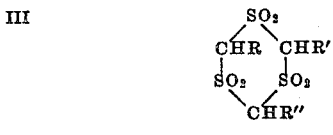

IV 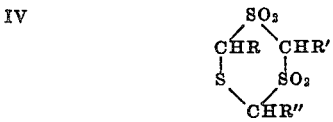

V 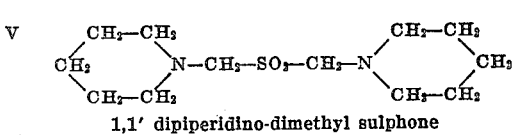

1,1' dipiperidino-dimethyl sulphone

VI 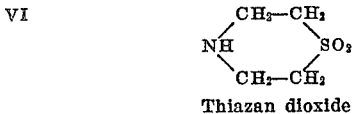

Thiazan dioxide

The reaction of the formaldehyde and/ or its polymer with the sulphone compound may be conveniently carried out in aqueous solution under alkaline conditions, and at either room temperature or under the influence of heat, conveniently at a moderate temperature. After the reaction, the resulting product may be separated from the solution in any convenient manner, for example by dilution and neutralisation. After separation of the product resinification may be effected by the action of heat.

The products of this invention find application in the plastics art and, in particular, may be used as a basis for stoving varnishes by dissolving in organic solvents as described in Examples 2, 3 and 4.

The term "hydrocarbon sulphone" as employed in the appended claims is intended to designate a sulphone in which the groups other than the sulphone groups are constituted by one or more hydrocarbon groups or one or more hydrogen groups or a mixture of hydrogen and hydrocarbon groups.

The following examples, in which the parts and percentages are expressed by weight illustrate various ways in which the invention may be carried into effect.

*Example 1.*—18 parts of a 33% aqueous formaldehyde solution were added with cooling and shaking to a solution of 15 parts of trimethylene trisulphone (prepared from symmetrical trithiane in known manner) and 4.6 parts of sodium hydroxide in 100 parts of water, and the whole left at room temperature for four hours. The reaction mixture was then diluted with 100 parts of water and neutralised by the addition of the amount of acid equivalent to the sodium hydroxide used together with cooling and vigorous agitation, and the precipitated reaction product filtered and dried under vacuum below 30° C.

The product was resinified by heating at 160° C. to form an infusible mass which was resistant to the action of concentrated acids and alkalies.

*Example 2.*—3 parts of diethylsulphonyl methane (prepared from methylene bis-(ethyl sulphide) in known manner) was dissolved in 5 parts of 50% aqueous ethanol containing 1 part of sodium hydroxide and 50 parts of a 33% aqueous solution of formaldehyde added. The mixture was heated at 70° C. for two hours and was then cooled, neutralised with the amount of acid equivalent to the sodium hydroxide used and diluted with 200 parts of water. The yellow oil which separated was washed with water and then set to a wax-like solid.

A portion of this material was dissolved in boiling dimethyl formamide and a film poured from the solution was stoved at 180° C. for 15 minutes to give an exceptionally tough film of good chemical resistance.

*Example 3.*—3 parts of dimethyl sulphone (prepared from dimethyl sulphide in known manner) were dissolved in 40 parts of methylated spirit (74 over-proof) containing 3 parts of potassium hydroxide, and 3 parts of paraformaldehyde. The mixture was refluxed gently for 3 hours, and then cooled and neutralised with an amount of acid equivalent to the amount of potassium hydroxide originally taken. The mixture was filtered and the filtrate evaporated to dryness on the water-bath. A portion of the residue was treated with cold methylated spirit (74 over-proof) and the resulting mixture filtered. Resinification was effected by stoving a film, poured from this filtrate, at 180° C. for 20 minutes.

*Example 4.*—5 parts of dibenzyl sulphone (prepared from dibenzyl sulphide in known manner) were dissolved in 50 parts of methylated spirit (74 over-proof) containing 5 parts of paraformaldehyde and 1.5 parts of potassium hydroxide. The mixture was refluxed gently for 2 hours and then cooled and neutralised with an amount of acid equivalent to the amount of potassium hydroxide originally taken. The mixture was filtered and the filtrate poured into 300 parts of water. The gummy white precipitate formed was filtered off and dried under vacuum at 30° C. Resinification was effected by baking, at 160° C. for 15 minutes, a film poured from a solution of this material in alcohol.

It will be understood that the details given in the foregoing examples are applicable, without significant alteration, to the treatment of other compounds containing one or more groupings >CH-SO₂-CH<.

What we claim is:

1. A process according to claim 3, wherein said hydrocarbon sulphone is a di-alkyl sulphone.

2. A process according to claim 3, wherein said hydrocarbon sulphone is dimethyl sulphone and said diluent is aqueous alcohol.

3. A process which comprises reacting a hydrocarbon sulphone containing the radical

CH-SO₂-CH selected from the group consisting of trimethylene trisulphone and dialkyl sulphones with formaldehyde in the presence of a diluent selected from the group consisting of water and a liquid alcohol and at a temperature between room temperature and the boiling point of the reaction mixture, to form a reaction product in which the main constituent is the reaction product of said sulphone and formaldehyde, and heating the reaction product to form a resin.

4. A process according to claim 3 wherein said hydrocarbon sulphone is trimethylene trisulphone.

5. A process according to claim 3 wherein said hydrocarbon sulphone is diethylsulphonyl methane.

6. As a new composition of matter, the synthetic resinous material formed by reacting a hydrocarbon sulphone containing the radical

CH-SO₂-CH selected from a group consisting of trimethylene trisulphone and dialkyl sulphones with a substance selected from the group consisting of formaldehyde and a formaldehyde polymer to form a reaction product of which the main constituent is the reaction product between said sulphone and formaldehyde, and heating the reaction product to form said resinous material, said resinous material being tough, flexible and resistant to the action of acids and alkalies.

EDWARD MICHAEL EVANS.
HARRY THURSTON HOOKWAY.

REFERENCES CITED

The following references are of record in the file of this patent:

UNITED STATES PATENTS

| Number | Name | Date |
|---|---|---|
| 2,363,616 | Patrick | Nov. 28, 1944 |
| 2,410,395 | Smidth | Oct. 29, 1946 |

OTHER REFERENCES

Fromm et al.: Ber., vol. 42, pp. 3823–6 (1909).